(12) United States Patent
Ariki et al.

(10) Patent No.: US 7,124,930 B2
(45) Date of Patent: Oct. 24, 2006

(54) WELDING METHOD AND TUBULAR MEMBER AND GEAR PUMP MADE USING THE WELDING METHOD

(75) Inventors: Fumiyoshi Ariki, Aichi (JP); Hitoshi Mizutani, Mie (JP); Akinori Nakayama, Mie (JP); Yasunori Kawamoto, Aichi (JP); Hideaki Shirai, Aichi (JP)

(73) Assignees: Advics Co., Ltd., Aichi (JP); Denso Corporation, Aichi (JP)

( * ) Notice: Subject to any disclaimer, the term of this patent is extended or adjusted under 35 U.S.C. 154(b) by 122 days.

(21) Appl. No.: 10/625,541

(22) Filed: Jul. 24, 2003

(65) Prior Publication Data
US 2004/0238505 A1 Dec. 2, 2004

(30) Foreign Application Priority Data
Jul. 25, 2002 (JP) .............................. 2002-217120

(51) Int. Cl.
B21D 39/00 (2006.01)
B23K 31/02 (2006.01)
(52) U.S. Cl. ............................. 228/173.4; 228/173.1; 29/890.04
(58) Field of Classification Search ................ 228/101, 228/173.1, 173.4; 29/33 D; 73/367.1
See application file for complete search history.

(56) References Cited

U.S. PATENT DOCUMENTS

| | | | | |
|---|---|---|---|---|
| 1,846,368 A | * | 2/1932 | Smith | 228/139 |
| 2,912,075 A | * | 11/1959 | Pfistershammer | 52/721.4 |
| 4,140,204 A | * | 2/1979 | Wilson | 181/265 |
| 4,202,484 A | * | 5/1980 | Peterson | 228/173.2 |
| 4,566,623 A | * | 1/1986 | Dufft | 228/138 |
| 4,590,652 A | * | 5/1986 | Harwood | 29/890.08 |
| 5,150,520 A | * | 9/1992 | DeRisi | 29/890.043 |
| 5,290,974 A | * | 3/1994 | Douglas et al. | 181/228 |
| 5,464,240 A | * | 11/1995 | Robinson et al. | 280/281.1 |

FOREIGN PATENT DOCUMENTS

| | | |
|---|---|---|
| JP | 2000-009058 A | 1/2000 |
| JP | 2001-080498 A | 3/2001 |
| JP | 2002-321077 A | 11/2002 |

* cited by examiner

Primary Examiner—Lynne R. Edmondson
(74) Attorney, Agent, or Firm—Buchanan Ingersoll & Rooney PC

(57) ABSTRACT

A gear pump having an inner rotor and an outer rotor is covered by a cylindrical outer casing and side casings. The cylindrical outer casing has two outer circumferential edges which are welded over the entire circumference thereof to the outer edges of the side casings, respectively. The outer casing has two angularly spaced recesses in its inner periphery for receiving slide seals therein. Welding is started at a welding start point which is 90 degrees spaced from the middle point between two recesses. During welding, welding energies are applied to the welding start point and the middle point between two recesses. Those energies tend to deform the casing into oval shapes that are 90 degrees out of phase from each other. Thus, these energies cancel each other, thereby preventing the casing from being deformed.

4 Claims, 6 Drawing Sheets

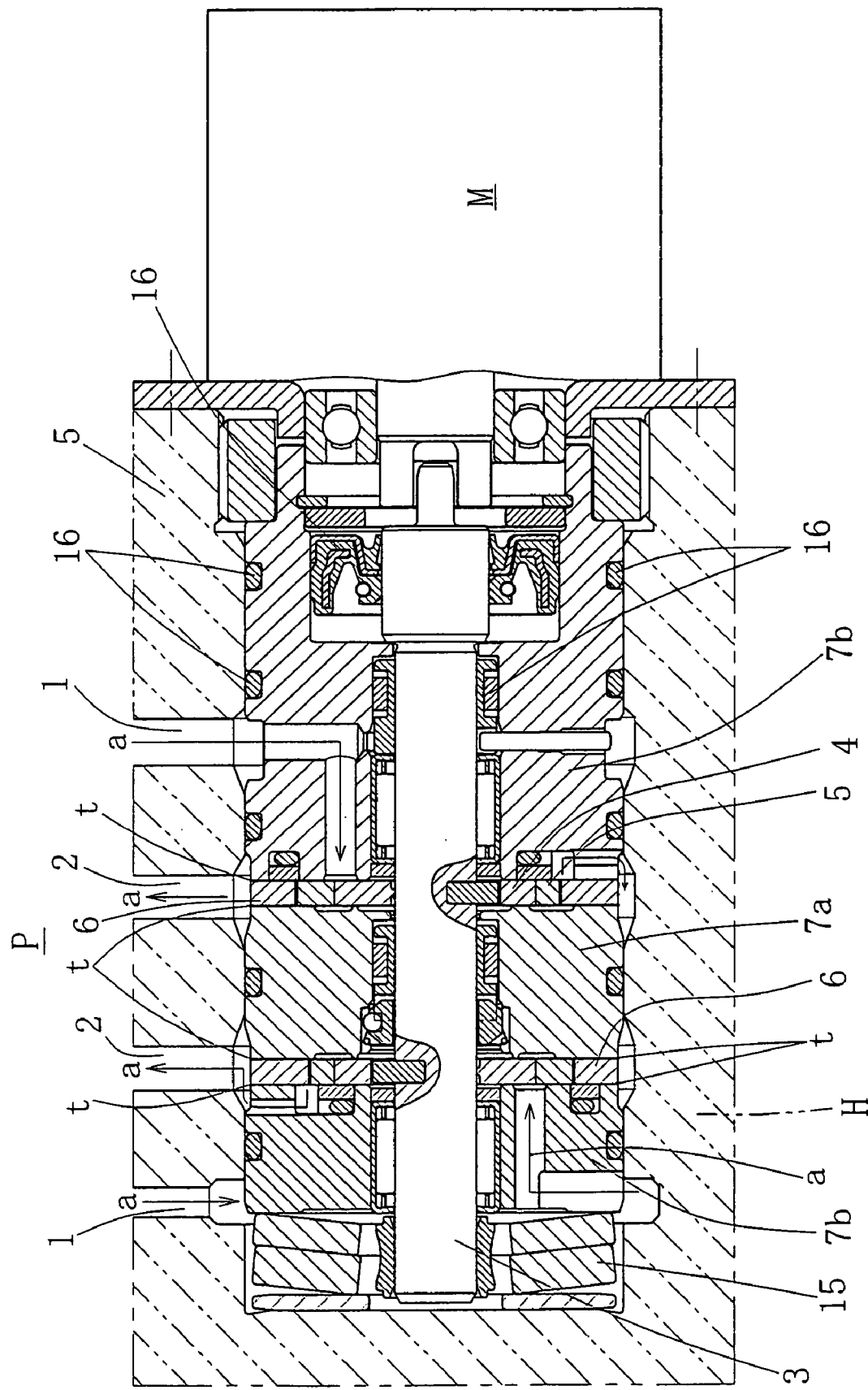

WELDING METHOD AND TUBULAR MEMBER AND GEAR PUMP MADE USING THE WELDING METHOD

BACKGROUND OF THE INVENTION

This invention relates to a method of welding tubular members such as casings of a gear pump, tubular member welded by use of the welding method, and a gear pump including casings welded by use of the welding method.

FIGS. 2–4 show a gear pump assembly P which is disclosed in JP patent publications 2000-9058 and 2001-80498. It is mounted in a housing H of various devices, and sucks oil a through inlet ports 1 and discharge it through outlet ports 2. Specifically, the pump assembly comprises a rotary shaft 3 driven by a motor M, and a plurality of (two in the illustrated example) gear pumps arranged axially around the rotary shaft 3 and each comprising an inner rotor 4 fixed to the rotary shaft 3 and an outer rotor 5 rotatably mounted in the housing H so as to be eccentric relative to the inner rotor 4. The inner rotor 4 and the outer rotor 5 mesh with each other, thereby causing oil to be sucked into and discharged from the gear pump.

The pump assembly further includes casings 7 each housing a gear pump, a center cylinder 7a and side cylinders 7b which cooperate to define pump spaces in which are received the gear pumps. Each casing 6 has to be hermetically joined to the center cylinder 7a and the corresponding side cylinder 7b. Ordinarily, each casing 6 is welded to the cylinders 7a and 7b over the entire outer circumferential edges thereof as shown at t.

Such welding is started from a desired point of the outer circumferential edge of each casing 6 with a welder S facing the casing 6 and continued in a circumferential direction.

FIG. 3 shows the section of one of the gear pumps. As shown, the outer rotor 5 is biased by slide seals (apex seals) 8 such that gaps defined by the teeth of the inner rotor 4 and the outer rotor 5 gradually increase from the outlet port toward the inlet port. The seals 8 are received in recesses 9 formed in the casing 6. The wall of the casing 6 is thus thin at points where there are the recesses 9. During welding, solidifying force locally act on the casing 6. The condensing force tends to deform the casing 6 more markedly at its thin and thus weak portions due to the presence of the recesses 9 than at other portions.

For example, if welding is started at the point shown in FIG. 5, when welding is being carried out at the portion of a member 10 (casing 6) to be welded to other member where there is a cutout 11 (recess 9), due to the solidifying force b resulting from welding energy, bending stresses Q are applied to the member 10 (casing 6), thus deforming the member 10 into an oval shape of which the minor axis passes the cutout 11, as shown by chain line in FIG. 5.

On the other hand, if the member 10 has no cutout, when welding is started at a point c, due to the solidifying force produced at the welding start point c, the member will be deformed into an oval shape of which the minor axis passes the welding start point c, and the portions in the circumference will deform in a sinusoidal curve, as shown in FIG. 6.

If the member is a casing 6 of a gear pump P, it will be difficult to mount the outer rotor 5 in such a markedly deformed casing with high accuracy or may be utterly impossible to mount the outer rotor 5 in such a casing.

An object of this invention is to minimize the degree of deformation of such a member to be welded.

BRIEF DESCRIPTION OF THE DRAWINGS

Other features and objects of the present invention will become apparent from the following description made with reference to the accompanying drawings, in which:

FIG. 2 is a partially cutaway front view of a gear pump to which is applied the concept of this invention;

DETAILED DESCRIPTION OF THE PREFERRED EMBODIMENT

As described above, the solidifying force acts on the casing at the welding start point c and at the cutout 11. The solidifying force that acts on the welding start point c tends to deform the member 10 into an oval shape of which the minor axis passes the point c, while the solidifying force that acts on the cutout 11 tends to deform the member 10 into an oval shape of which the minor axis passes the cutout 11. This means that if the point c and the cutout 11 are angularly spaced apart from each other such that the cutout 11 is positioned at or near one of the crests of the curve of FIG. 6, the solidifying forces acting on the point c and the cutout 11 cancel each other, so that the member 10 can maintain its original circular section.

Figure 1A:
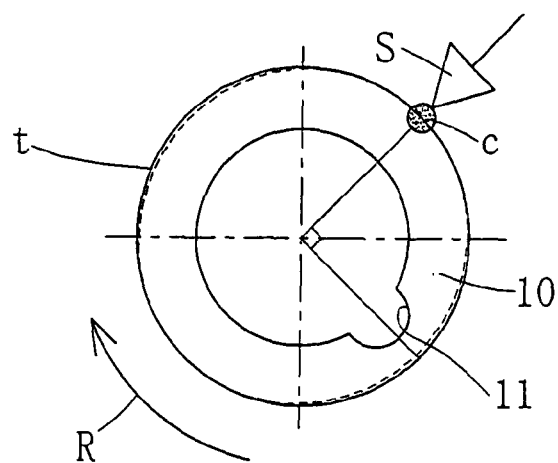
FIGS. 1A–1F are schematic views showing different embodiments of this invention.
Figure 6:
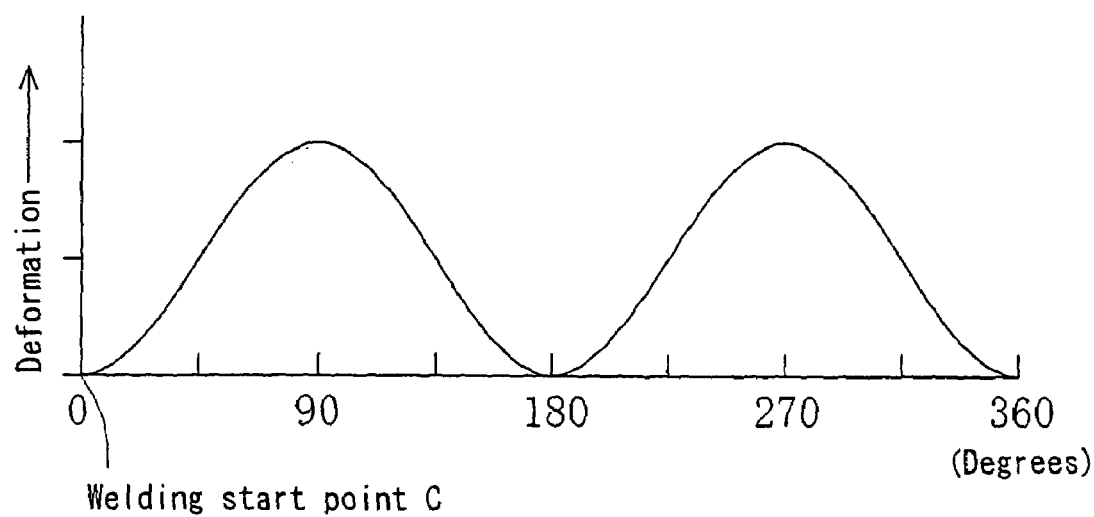
FIG. 6 is a graph showing how the tubular member is deformed from the welding starting point.

Specifically, for a member having deforming characteristics as shown in FIG. 6, the cutout 11 and the welding start point c should be angularly spaced from each other by about 90 degrees in either circumferential direction. That is, in this case, as shown in FIG. 1A, welding should be started at a point c which is angularly spaced from the cutout 11 by about 270 degrees with respect to the turning direction R of the member 10. Instead, welding may be started at a point that is angularly spaced from the cutout 11 by about 90 degrees with respect to the turning direction R. As used herein, the term "90 degrees" encompasses an area which includes the 90-degree point and an area in which the solidifying forces applied to the member at the welding start point and the cutout cancel each other to such a degree that the member will not be deformed at all or deformed very little.

With this arrangement, welding forces applied to the member at its welding start point and the cutout cancel each other, allowing the member to maintain substantially its original circular section after welding (compare the solid line with the chain line, which show the sections of the member before and after welding).

Figure 1B:
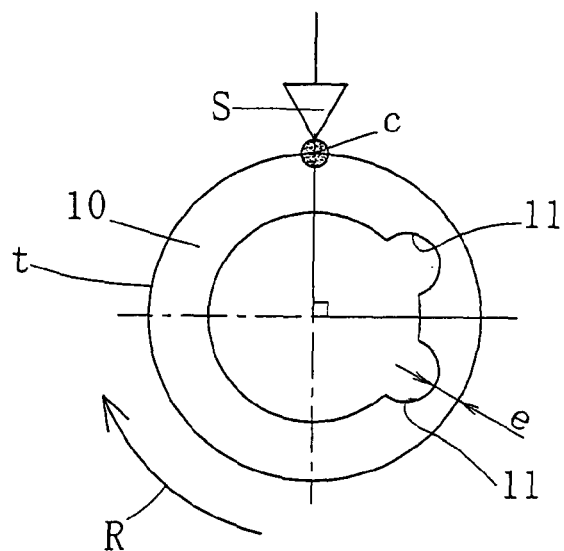
Figure 1C:
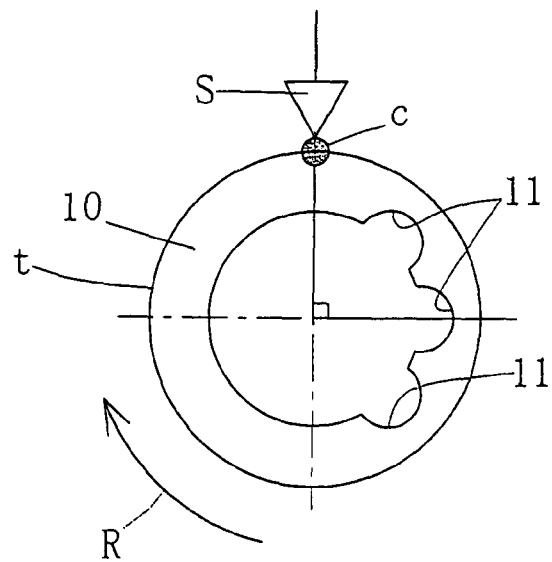

If the member 10 has a plurality of thin portions, the welding start point may be determined with respect to the thinnest portion. But more preferably, the welding start portion should be displaced taking into consideration the number and shapes of thin portions. For example, if the member 10 has two cutouts 11 having the same size (sectional area) as shown in FIG. 1B, welding should be started at a point angularly spaced in either circumferential direction by about 90 degrees from the mid point of the two cutouts. If the member 10 has three equiangularly spaced cutouts 11 having the same sectional area as shown in FIG.

1C, welding should be started at a point angularly spaced in either circumferential direction by 90 degrees from the center of the central cutout.

If more than two cutouts are arranged at different angular intervals, or they have different sizes, the weld start point c should be determined taking into consideration the balance between the solidifying force at the welding start point and that at the cutout.

Figure 1D:
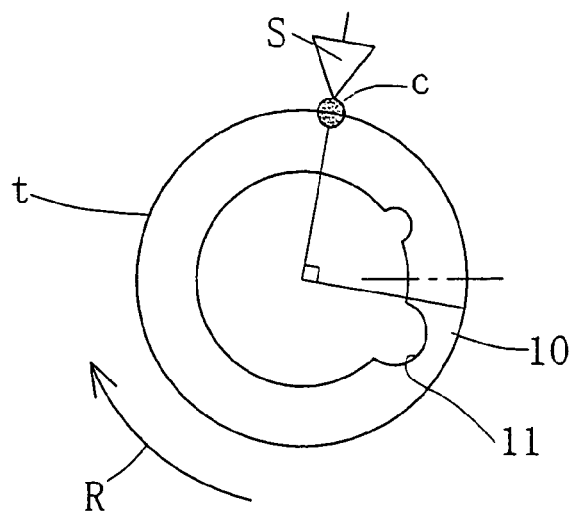
Figure 1E:
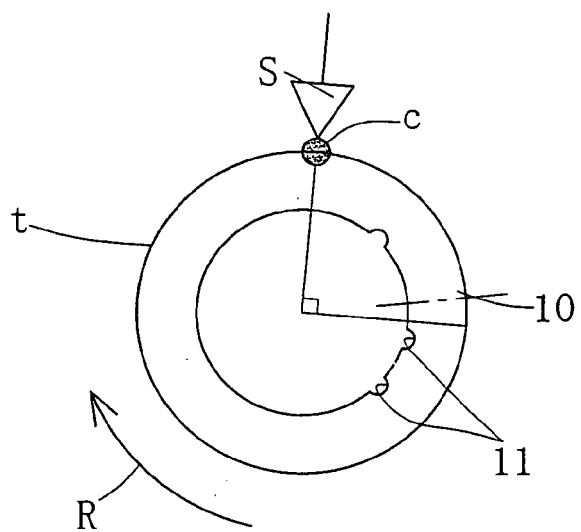
Figure 1F:
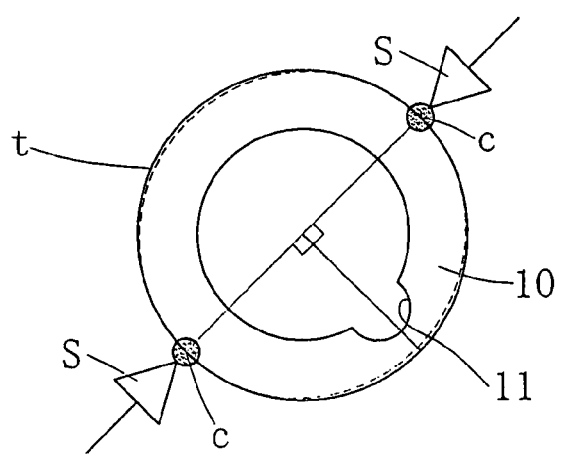

For example, if the member 10 has large and small cutouts as shown in FIG. 1D, welding should be started at a point 90 degrees spaced from a point closer from the center point to the larger cutout than to the smaller cutout. If, as shown in FIG. 1E, the member has three cutouts 11 that have the same size and are arranged such that the angular distance between the first central cutout and a second cutout is twice the distance between the first central cutout and the third cutout, welding should be started at a point 90 degrees spaced in either circumferential direction from a point nearer to the third cutout than a mid-point between the second cutout and the third cutout and the first central cutout.

The concept of the present invention is applicable to a member formed with a cutout or cutouts having a non-cylindrical section, such as a triangular, square, hexagonal or elliptical section, or to a member of which the wall thickness changes gradually in the circumferential direction. For example, for a member which is formed with a cutout 11 and whose wall thickness changes in a circumferential direction, the welding start point should be determined taking the wall thickness into consideration. If the wall thickness increases from the cutout in the circumferential direction R, welding should be started at a point nearer to the cutout 11 than is the point c in FIG. 1A or a point diametrically opposite this point.

Such an all around welding may be carried out after spot welding at equal angular spacings in the manner described above. As shown in FIG. 1b, welding may be started at two diametrically opposite points that are 90 degrees spaced from the reference point in both circumferential directions. All around welding is carried out by rotating the members to be welded together. The rotating speed (or the welding speed) and the rotating direction R should be determined taking into consideration various factors including the shape of the members to be welded together and by experiments.

The concept of this invention is applicable when joining a tubular member to another member, such as when welding both side edges of the casing 6 of each of the gear pumps P to the outer edges of the cylinders 7a and 7b over the entire circumference thereof.

Figure 3:
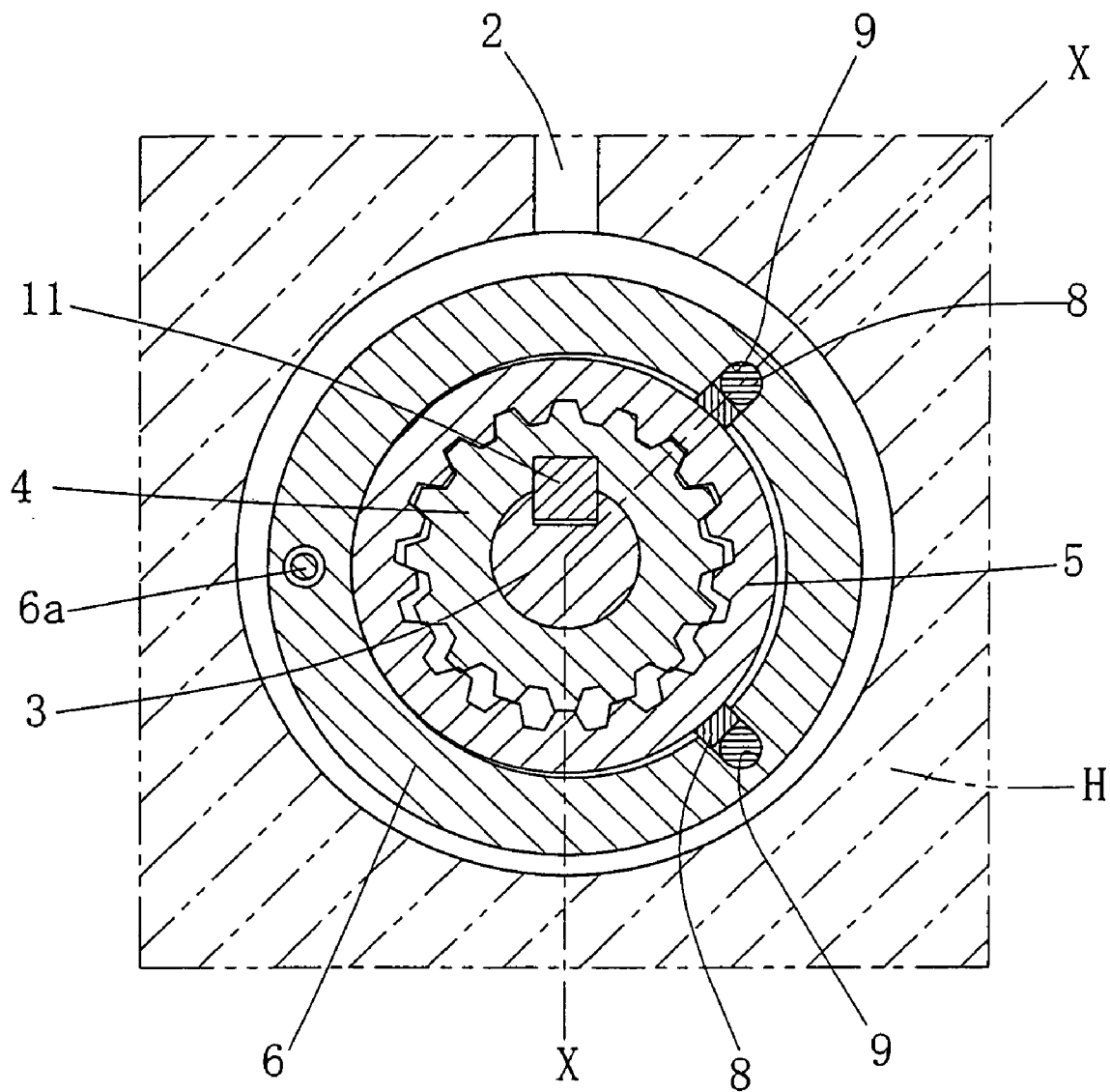
FIG. 3 is a cross-sectional view of the gear pump of FIG. 2.
Figure 4:
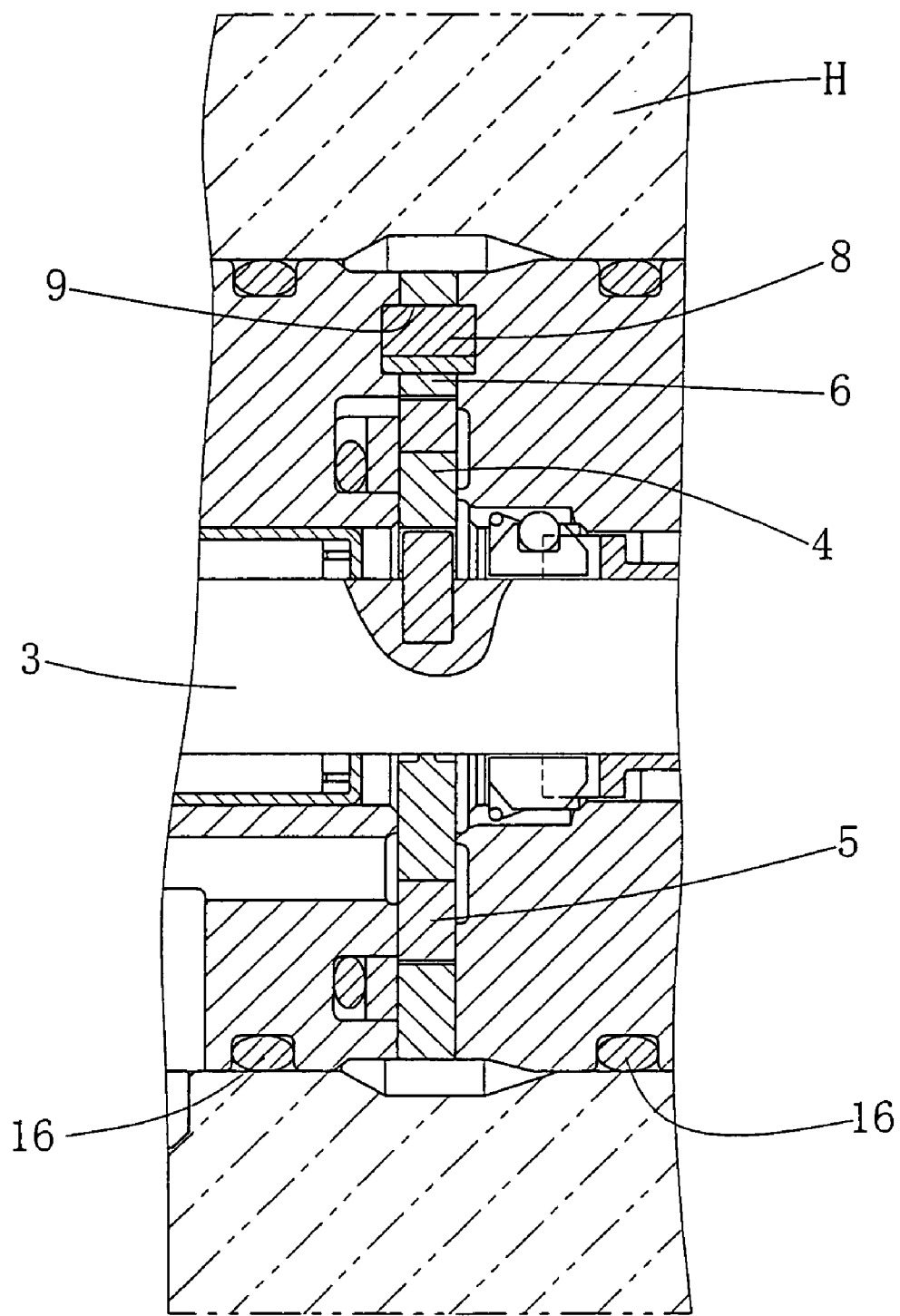
FIG. 4 is a partial sectional view along line X—X of FIG. 3.
Figure 5:
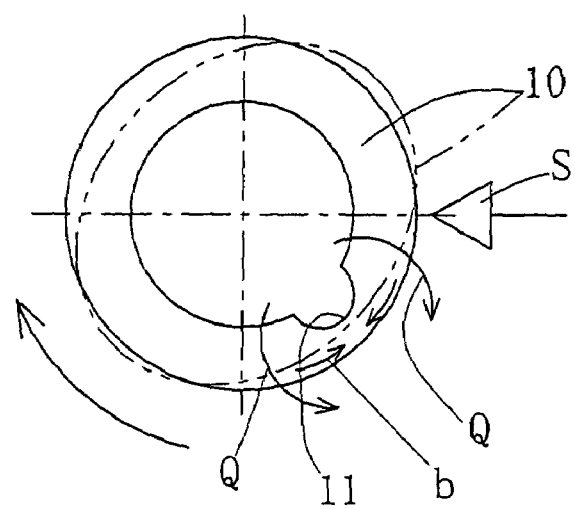
FIG. 5 is a schematic view showing a conventional welding method.

Using the concept of the present invention, the casings 6 of the two gear pumps of the gear pump assembly P shown in FIGS. 2–4 were welded by laser beams to the outer edges of the center cylinder 7a and the side cylinders 7b in the manner shown in FIG. 1B. The casings 6 were deformed very little, so that it was possible to mount the outer rotors 5 in the respective casings 6 with high accuracy. One of the gear pumps is arranged as shown in FIG. 3, while the other is arranged 180 degrees out of phase, that is, upside down with respect to the central axis of the shaft 3. As shown FIG. 3, a pin 6a extends through the casing 6 of each gear pump and the cylinders 7a and 7b to keep them in position relative to each other.

The gear pump assembly P shown in FIG. 2 includes a leaf spring 15 and seals 16. For more detailed structure of this gear pump assembly, reference should be to the above-mentioned Japanese patent publications.

By using the concept of this invention, it is possible to carry out all around welding of parts while minimizing deformation the part to be welded.

What is claimed is:

1. A method of welding a tubular member having a thin portion in its circumference and having a circumferential outer edge to another member over the entire circumference of said tubular member, characterized in that welding is started at a point of said circumferential outer edge that is angularly spaced from said thin portion.

2. The method as claimed in claim 1 wherein said tubular member has an annular cross-section, wherein a first solidifying force produced by welding tends to deform said tubular member into an oval shape having a minor axis that passes said thin portion; a second solidifying force produced by welding tends to deform said tubular member into an oval shape having a minor axis that passes said point; the deformation tendencies produced respectivley by said first and second solidifying substantially canceling each other; said said second solidifying force being produced when welding is started at said point and carried out over the entire circumference of said tubular member.

3. The method as claimed in claim 2 wherein said point is angularly spaced from said thin portion by about 90 degrees.

4. The method as claimed in claim 2 wherein said tubular member has two thin portions which have the same thickness and wherein welding is started at a point angularly spaced about 90 degrees from the midpoint between said two thin portions.

* * * * *